Patented Aug. 31, 1948

2,448,094

UNITED STATES PATENT OFFICE 2,448,094

DYESTUFFS OF THE ANTHRAQUINONE SERIES

Ernst Gutzwiller, Basel, Switzerland, assignor to Sandoz Ltd., Fribourg, Switzerland, a Swiss firm No Drawing. Application March 9, 1945, Serial No. 581,957. In Switzerland September 30, 1943

Section 1, Public Law 690, August 8, 1946
Patent expires September 30, 1963

4 Claims. (Cl. 260—371)

The present invention relates to new dyestuffs of the anthraquinone series, which dye animal fibres into blue to green shades, possessing excellent fastness properties and to the process for their manufacture.

According to U. S. Letters Patent No. 2,042,757, acid dyestuffs can be prepared by the condensation of polynuclear amines with anthraquinone compounds which contain in positions 1 and 4 groups capable of being substituted.

It has now been found that very valuable new acid dyestuffs can be obtained by condensing 2-amino-1:2:3:4-tetrahydronaphthalene with anthraquinone compounds which contain in positions 1 and 4 groups capable of being replaced by the amine and which are substituted in 6- and/or 7-position by halogen, and by subsequently sulfonating the resultant condensation products.

Illustrative of anthraquinone compounds which are suitable for this condensation are 6:7-dichloroquinizarine, 6:7-dibromoquinizarine, 6:7-bromo-chloroquinizarine, 6:7-dichloro-1:4-hydroxyaminoanthraquinone, 6:7-dichloro-1:4-diaminoanthraquinone and the leuco-derivatives of these compounds. Furthermore, polyhalogenated anthraquinone compounds such as 1:4:6:7-tetrahalogenanthraquinone may also be used.

The condensation of the anthraquinone compound with the amine is carried out preferably in presence of a solvent and of condensing agents like boric acid and copper salts. Of course, the amine can be used simultaneously as solvent. On the other hand, high boiling alcohols, like amyl- and benzyl-alcohol, methylhexaline or other organic solvents, can be used as inert solvents.

The condensation is generally carried out at temperatures over 100° C. and is maintained until starting anthraquinone compound can no longer be detected in the condensation mixture. Generally, a mixture of anthraquinone- and leuco-anthraquinone compounds is used; when the condensation is finished, the leuco compound thus produced is oxidised by means of an air stream, preferably in presence of an alkaline compound and of a copper derivative.

The isolation of the new condensation products is carried out according to the methods generally used for the manufacture of anthraquinone compounds and the sulphonation of the insoluble products is carried out preferably with sulphuric acid monohydrate or with sulphuric acid containing about 5–10% of sulphuric acid anhydride.

The following examples, without being limitative, illustrate the present invention, the parts being by weight.

Example 1

20 parts of leuco-6:7-bromochloroquinizarine and 120 parts of 2-amino-1:2:3:4-tetrahydronaphthalene are stirred together at 120°–150° C., until the condensation is finished. After oxidation with an air stream, which may take place in presence of some piperidine and copper acetate, the condensation product is precipitated by diluting the charge with 120 parts of ethanol and filtered off. By re-crystallisation from an organic solvent it can be completely purified. By treating this base with 4–6 times its weight of sulphuric acid monohydrate at 0°–20° C., a dyestuff will be obtained dyeing wool in very fast brilliant blue shades.

Example 2

10 parts of leuco-6:7-dichloroquinizarine, 10 parts of 6:7-dichloroquinizarine, 10 parts of boric acid and 120 parts of 2-amino-1:2:3:4-tetrahydronaphthalene are stirred together at 120°–150° C., until the condensation is finished. After oxidation with an air stream the condensation product is precipitated by dilution with 150 parts of ethanol and isolated by filtration. Dark crystals being soluble in organic solvents with a greenish-blue shade will thus be obtained. By treating the base with 4–8 times its weight of sulphuric acid monohydrate at 0°–20° C. a dyestuff will be obtained which dyes wool in brilliant greenish-blue shades.

Example 3

20 parts of leuco-6:7-dichloroquinizarine and 100 parts of 2-amino-1:2:3:4-tetrahydronaphthalene are heated at 100°–150° C. under good stirring and in absence of air until the condensation is finished. After oxidation by means of an air stream, which may take place in the presence of some piperidine and copper acetate, the reaction product is precipitated by means of an addition of 100 parts of ethanol, filtered and washed with ethanol. After crystallisation from an organic solvent like pyridine, aniline, nitrobenzene or methylhexaline, the base can be obtained in a pure form. By treating this base at 0°–30° C. with 4 to 6 times its weight of concentrated sulphuric acid or sulphuric acid monohydrate a dyestuff will be obtained that dyes animal fibres and nylon in beautiful blue shades of excellent fastness properties.

Instead of leuco-6:7-dichloroquinizarine, a mixture of 6:7-dichloroquinizarine with leuco-6:7-dichloroquinizarine may also be used. The condensation can also be carried out in the presence of diluting agents, like amyl alcohol, butyl alcohol, methylhexaline or acetic acid, and if necessary in the presence of condensing agents, like boric acid.

The working up of the base can also be carried out in such a manner that, after the condensation has completed, the reaction mass is poured into diluted hydrochloric acid. After heating for a short time, the base is filtered off, washed out with hot water and dried. The raw base thus obtained is then taken up in a solvent, like nitrobenzene, aniline, pyridine, quinoline, tetraline, dichlorobenzene or methylhexaline, heated up to a higher temperature and treated with an air stream blown on the surface of the liquid. After dilution with ethanol and addition of some caustic soda lye, the base can be obtained in pure form.

*Example 4*

10 parts of leuco-6-chloroquinizarine, 10 parts of 6-chloroquinizarine, 10 parts of boric acid and 120 parts of 2-amino-1:2:3:4-tetrahydronaphthalene are stirred together at 120°–150° C. until the condensation is finished. After oxidation with an air stream the condensation mass is diluted with 150 parts of ethanol and the base thus precipitated separated by filtration. Bronzing crystals will be obtained which are soluble in organic solvents with a blue coloration. By treating the condensation product with 4–8 times its weight of sulphuric acid monohydrate at 0°–20° C. a dyestuff will be obtained that dyes wool in very brilliant blue shades.

*Example 5*

20 parts of leuco-6-chloroquinizarine, 100 parts of the carbonate of 2-amino-1:2:3:4-tetrahydronaphthalene and 80 parts of methylhexaline are heated in absence of air at 100°–150° C. until the condensation is finished. The isolation of the base is carried out in the usual way, whereby a compound will be obtained identical with that described in Example 4.

Instead of methylhexaline, other diluting agents, like amyl alcohol, benzyl alcohol, etc. can be used.

Instead of leuco-6-chloroquinizarine, there may be used leuco-6-chloro-1:4-diaminoanthraquinone, leuco-6-chloro-1:4-hydroxyaminoanthraquinone and also the mixtures of the said compounds with leuco-6-chloroquinizarine and 6-chloroquinizarine.

What I claim is:
1. An anthraquinone dyestuff of the formula

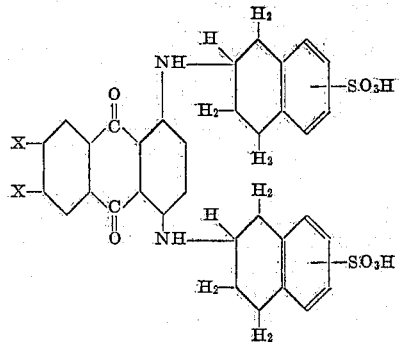

wherein one X is a member selected from the group consisting of chlorine and bromine, and the other X is a member selected from the group consisting of hydrogen, chlorine and bromine.

2. An anthraquinone dyestuff of the formula

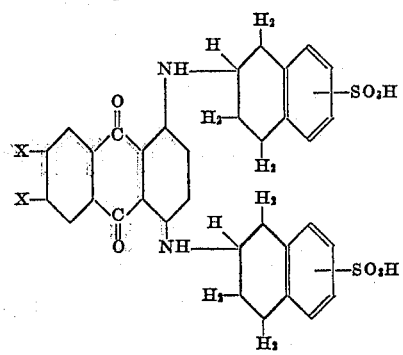

wherein X is a member of the group consisting of chlorine and bromine.

3. An anthraquinone dyestuff of the formula

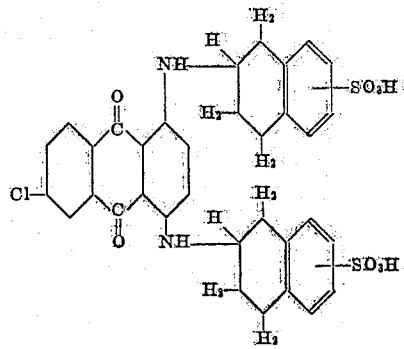

4. An anthraquinone dyestuff of the formula

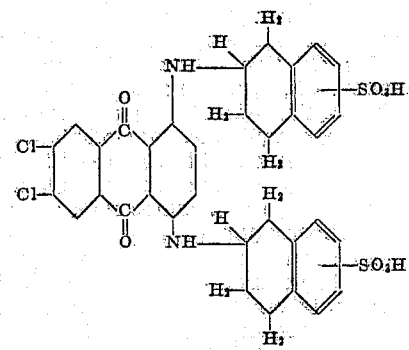

ERNST GUTZWILLER.

REFERENCES CITED

The following references are of record in the file of this patent:

UNITED STATES PATENTS

| Number | Name | Date |
|---|---|---|
| 1,877,900 | Kronholz | Sept. 20, 1932 |
| 2,042,757 | Zahn et al. | June 2, 1936 |
| 2,204,748 | Buxbaum | June 18, 1940 |
| 2,315,788 | Gutzwiller | Apr. 6, 1943 |
| 2,377,145 | Gutzwiller | May 29, 1945 |

FOREIGN PATENTS

| Number | Country | Date |
|---|---|---|
| 158,443 | Switzerland | Jan. 16, 1933 |